United States Patent
Kurimoto

(10) Patent No.: US 11,390,290 B2
(45) Date of Patent: Jul. 19, 2022

(54) VEHICLE ELECTRONIC CONTROL APPARATUS

(71) Applicant: Mitsubishi Electric Corporation, Tokyo (JP)

(72) Inventor: Masanori Kurimoto, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 242 days.

(21) Appl. No.: 16/285,301

(22) Filed: Feb. 26, 2019

(65) Prior Publication Data

US 2020/0001885 A1 Jan. 2, 2020

(30) Foreign Application Priority Data

Jun. 28, 2018 (JP) .............................. JP2018-122629

(51) Int. Cl.
*B60W 50/023* (2012.01)
*B60R 16/023* (2006.01)
*B60W 50/02* (2012.01)
*G07C 5/08* (2006.01)
*B60W 50/00* (2006.01)

(52) U.S. Cl.
CPC ....... *B60W 50/023* (2013.01); *B60R 16/0232* (2013.01); *B60W 50/0205* (2013.01); *G07C 5/0808* (2013.01); *B60W 2050/0083* (2013.01); *B60W 2050/021* (2013.01)

(58) Field of Classification Search
CPC ................................................ B60R 16/0232
See application file for complete search history.

(56) References Cited

U.S. PATENT DOCUMENTS 10,216,559 B2 * 2/2019 Fernandez ......... G01R 33/0029
2006/0036912 A1 2/2006 Abe et al.
(Continued)

FOREIGN PATENT DOCUMENTS

CN 105607698 A * 5/2016
CN 110687845 A * 1/2020
(Continued)

OTHER PUBLICATIONS

Communication dated May 21, 2019 issued by the Japanese Patent Office in counterpart application No. 2018-122629.
(Continued)

*Primary Examiner* — Aniss Chad
*Assistant Examiner* — Stephanie T Su
(74) *Attorney, Agent, or Firm* — Sughrue Mion, PLLC; Richard C. Turner

(57) ABSTRACT

The vehicle electronic control apparatus includes two or more FPGAs that each receive information from the sensor, a nonvolatile memory that holds a bit stream for determining a configuration for the FPGA, an MCU that incorporates two or more nonvolatile memories, in each of which a program code for calculating the control command is installed, and an error control module that outputs an error signal to the outside at a time when an abnormality occurs in at least one of the FPGA and the nonvolatile memory incorporated in the MCU; the nonvolatile memory that holds the bit stream and the nonvolatile memory incorporated in the MCU can be accessed from the outside.

4 Claims, 6 Drawing Sheets

(56) References Cited

U.S. PATENT DOCUMENTS

| | | | | |
|---|---|---|---|---|
| 2007/0233340 A1* | 10/2007 | Raichle | ................ | B60W 50/02 |
| | | | | 701/29.3 |
| 2008/0258758 A1* | 10/2008 | Kaizu | ................ | G06F 11/1068 |
| | | | | 714/724 |
| 2012/0089293 A1* | 4/2012 | Halder | ................ | B60W 50/038 |
| | | | | 701/24 |
| 2016/0048383 A1* | 2/2016 | Nachimuthu | ............. | G06F 8/65 |
| | | | | 717/173 |
| 2016/0381068 A1* | 12/2016 | Galula | ................ | B60R 16/0231 |
| | | | | 726/23 |
| 2017/0070229 A1 | 3/2017 | Mertens et al. | | |
| 2017/0259942 A1* | 9/2017 | Ziarno | ................... | G07C 5/085 |
| 2018/0136999 A1* | 5/2018 | Fernandez | ......... | G01R 33/0029 |
| 2018/0254903 A1* | 9/2018 | Bardelski | .............. | H04L 9/3228 |
| 2018/0276913 A1* | 9/2018 | Garcia | ................... | H04L 12/40 |
| 2018/0293816 A1* | 10/2018 | Garrett | ............... | B60R 16/0234 |
| 2019/0121353 A1* | 4/2019 | Datema | ................ | G05D 1/0044 |

FOREIGN PATENT DOCUMENTS

| | | |
|---|---|---|
| JP | 2006-53873 A | 2/2006 |
| JP | 2011-8552 A | 1/2011 |
| JP | 2012-204898 A | 10/2012 |
| JP | 2017-54511 A | 3/2017 |
| JP | 2017-111579 A | 6/2017 |

OTHER PUBLICATIONS

Office Action dated Feb. 28, 2022 in Chinese Application No. 201910513828.X.

* cited by examiner

VEHICLE ELECTRONIC CONTROL APPARATUS

BACKGROUND OF THE INVENTION

Field of the Invention

The present disclosure relates to a vehicle electronic control apparatus.

Description of the Related Art

An vehicle electronic control apparatus mounted in a vehicle such as an automobile receives information pieces from various kinds of sensors that detect the operation state of an internal combustion engine mounted in the vehicle, the driving state of the vehicle, and the like, information from a CAN (Controller Area Network), and information transferred through a gateway from a remote channel; based on these information pieces, the vehicle electronic control apparatus calculates various kinds of control commands and outputs the calculated control commands to an actuator and the like; a vehicle electronic control apparatus is referred to also as an ECU (Electronic Control Unit). In the following explanation, a vehicle electronic control apparatus will be referred to as an ECU.

With regard to a conventional ECU, command codes and data pieces are written in a flash memory of the code section of a MCU (Micro Control Unit) before shipment thereof from a factory; a shipment test is applied to the ECU; then, the ECU, which has passed the shipment test, is shipped from the factory. In general, the command codes and the data pieces written in the nonvolatile memory in the MCU cannot be modified after the shipment.

In general, a logic that cannot be replaced by a general-purpose device is realized by an FPGA (Field Programmable Gate Array) or an ASIC (Application Specific Integrated Circuit); however, the logic cannot be changed after shipment thereof. The ECU shipped from the factory is delivered to an automobile manufacturer and then is assembled in a vehicle. Then, after being assembled and passing a shipment test, the vehicle, as a finished product, is sold to a general user.

In the case where in such a situation, modification of the software for the ECU or logical modification is required after the finished-product vehicle has been shipped, it is necessary to bring the vehicle to a dealer or the like and to replace the ECU, as a component of the vehicle. In this case, it generally takes several days to several weeks to repair and test the vehicle, and the user requests the dealer to arrange and provide a replacement vehicle during the period; thus, the burdens on the both sides are large.

To date, there has been disclosed a technology in which a device failure that has occurred in an FPGA in use is removed and then the hardware is reconfigured (for example, refer to Patent Document 1). Moreover, to date, there has been disclosed a technology in which a device failure that has occurred in an FPGA in use is removed and then the hardware is reconfigured while not only the logic but also the timing is considered (for example, refer to Patent Document 2).

PRIOR ART REFERENCE

Patent Document

[Patent Document 1] Japanese Patent Application Laid-Open No. 2017-111579

[Patent Document 2] Japanese Patent Application Laid-Open No. 2012-204898

As is well known, although the number of electronic components mounted in a single vehicle, especially the number of vehicle electronic control apparatuses has been increasing year after year, the quality levels of software and hardware are not suddenly raised; therefore, the increase in the number of mounted components, the circuit scale, or the amount of mounted software directly leads to deterioration in the quality. Moreover, the warranty period for the lifetime of a vehicle electronic component is the same as or longer than 20 years, in general; however, due to rapid technological evolution, the system configuration at a time of shipment may become unable to adapt itself to the current trend in the warranty period. Furthermore, when an abnormality occurs in the software or the hardware, it is required to bring the vehicle to a dealer or the like and to replace the ECU, which is a component in the vehicle.

Each of foregoing Patent Documents 1 and 2 discloses that when an abnormality exists in a FPGA, as the hardware of the ECU, the logic of the FPGA is reconfigured; however, nothing is disclosed at least with regard to the update or backup of the software.

The present disclosure has been implemented in order to solve the foregoing problems; the objective thereof is to provide a vehicle electronic control apparatus that can raise the customer satisfaction for a system and can prolong the lifetime thereof.

SUMMARY OF THE INVENTION

A vehicle electronic control apparatus disclosed in the present disclosure receives at least any one of information from a sensor that detects an operation state of an internal combustion engine mounted in a vehicle and a driving state of the vehicle, information from a CAN, and information from a remote channel and outputs a control command calculated based on the received information to an apparatus mounted in the vehicle; the vehicle electronic control apparatus includes two or more FPGAs that each receive information from the sensor, a nonvolatile memory that holds a bit stream for determining a configuration for the FPGA, an MCU that incorporates two or more nonvolatile memories, in each of which a program code for calculating the control command is installed, and an error control module that is provided in the MCU and outputs an error signal to the outside at a time when an abnormality occurs in at least one of the FPGA and the incorporated nonvolatile memory; the vehicle electronic control apparatus is characterized in that the nonvolatile memory that holds the bit stream and the nonvolatile memory incorporated in the MCU can be accessed from the outside.

The vehicle electronic control apparatus according to the present disclosure makes it possible to raise the reliability of a system and to update hardware or software; thus, there can be obtained a vehicle electronic control apparatus that raises the customer satisfaction and realizes prolongation of the lifetime.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Figure 1:
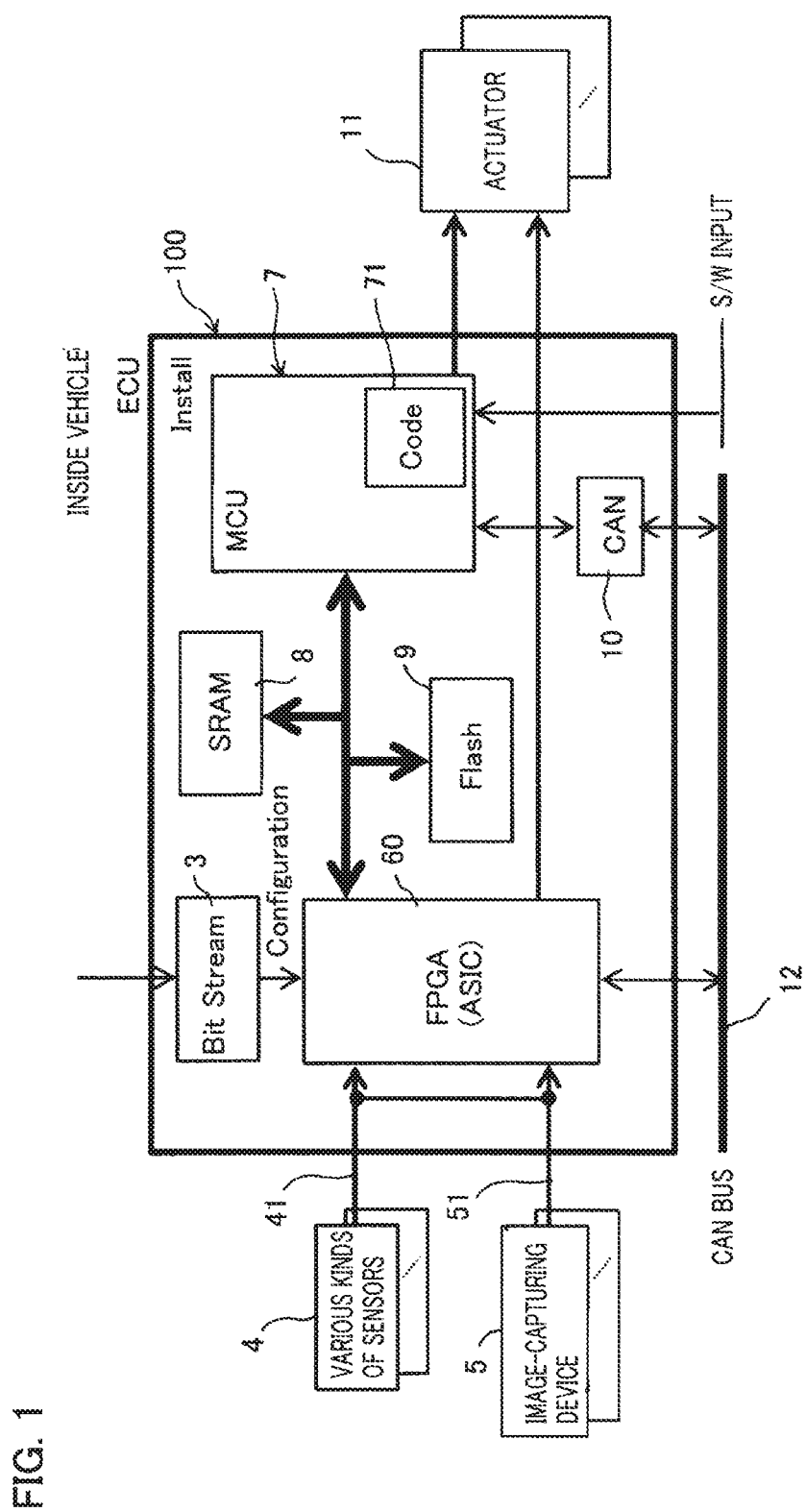
FIG. 1 is a block diagram representing the hardware configuration of a vehicle electronic control apparatus, which is the basis of the present disclosure.

Technology that is a Basis of the Present Disclosure:

At first, the technology that is a basis of the present disclosure will be explained. FIG. 1 is a block diagram representing the hardware configuration of a vehicle electronic control apparatus, which is the basis of the present disclosure. In FIG. 1, ECU 100, as a vehicle electronic control apparatus mounted in a vehicle, has a nonvolatile memory 3 that holds a bit stream for configuring an FPGA from a remote channel (unillustrated) through a gateway (unillustrated), an FPGA 60, an MCU 7, an SRAM (Static Random Access Memory) 8, a flash memory 9, and a CAN transceiver 10. The FPGA 60 may be replaced by an ASIC.

In the foregoing FPGA 60, a hardware logic is configured by a bit stream held in the nonvolatile memory 3. Then, the FPGA 60 receives analogue data 41 from a sensor 4, a laser detector, and the like that are mounted in the vehicle and image data 51 from an image-capturing device 5 such as a camera. At a time of shipment, the FPGA 60 is configured with an edition selected from two or more options including the present edition and the one-generation-prior edition.

Through the gateway, a program, as software, is installed, from the remote channel, in a nonvolatile memory 70 formed of a flash memory provided in MCU 7. At a time of shipment, the nonvolatile memory 70 has the program code of the edition selected from two or more options including the present edition and the one-generation-prior edition.

SRAM 8 is configured in such a way as to be situated between FPGA 60 and MCU 7 and to temporarily hold data. The flash memory 9 stores necessary communication data, as a log.

Through control by MCU 7, ECU 100 that is configured in such a way as described above and is the basis of Embodiment 1 controls an actuator 11 that operates apparatuses mounted in the vehicle, in a direct manner or through FPGA 60. Through a CAN bus 12, FPGA 60 can perform communication with another ECU. Through the CAN transceiver 10 and the CAN bus 12, MCU 7 can perform communication with another ECU.

When an abnormality occurs in ECU 100, which is the basis of Embodiment 1 represented in FIG. 1, it is required to bring the vehicle to a dealer or the like and to replace the ECU, which is a component in the vehicle. In that case, as described above, it generally takes several days to several weeks to repair and test the vehicle, and the user requests the dealer to arrange and provide a replacement vehicle during the period; thus, the burdens on the both sides are large.

Embodiment 1

Next, the vehicle electronic control apparatus according to Embodiment 1 of the present disclosure will be explained.

Figure 2:
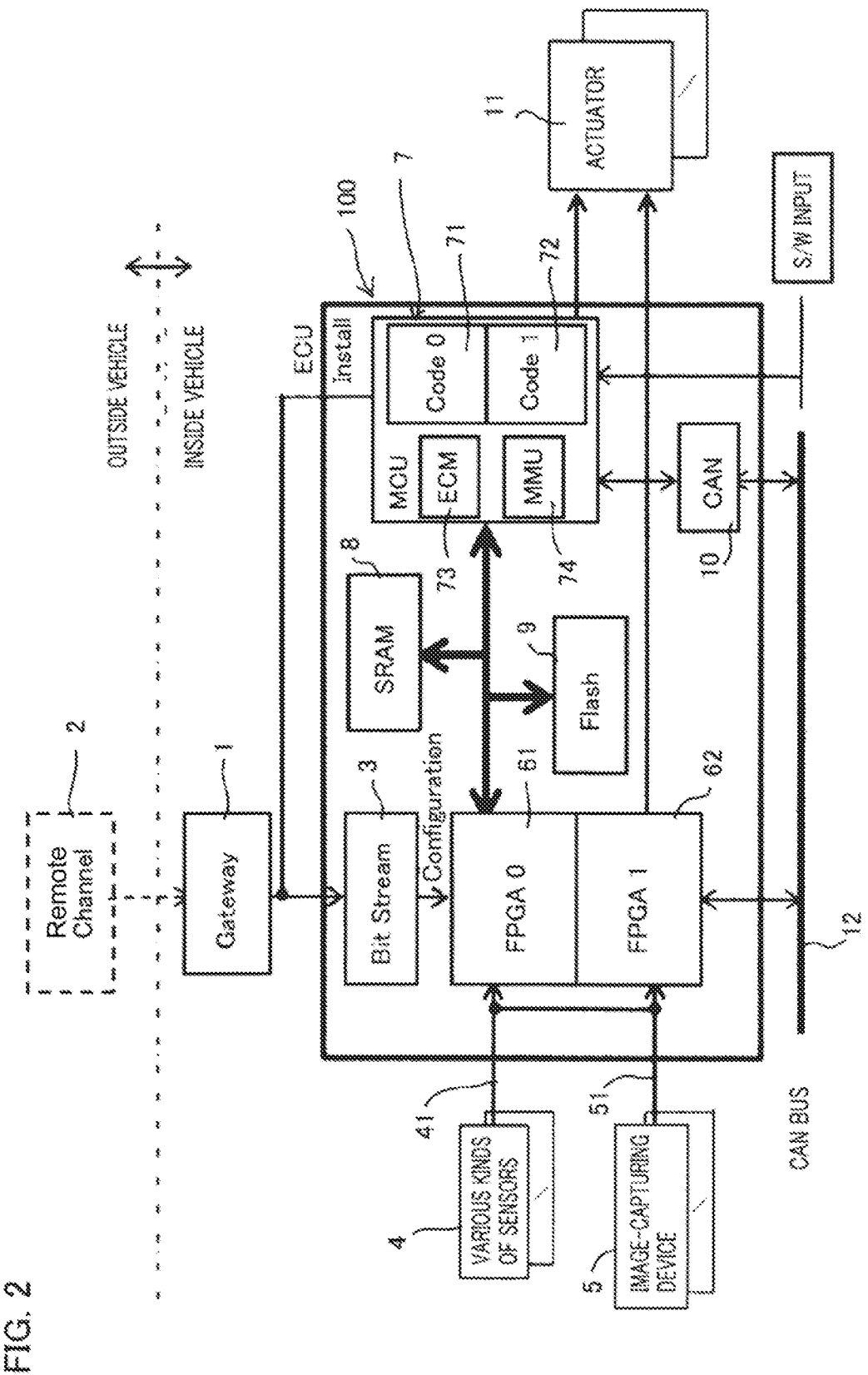
FIG. 2 is a block diagram representing the hardware configuration of a vehicle electronic control apparatus according to Embodiment 1.

FIG. 2 is a block diagram representing the configuration of the vehicle electronic control apparatus according to Embodiment 1. In FIG. 2, ECU 100, as a vehicle electronic control apparatus mounted in a vehicle, has the nonvolatile memory 3 that holds a bit stream for configuring an FPGA from a remote channel 2 through a gateway 1, a first FPGA 61, a second FPGA 62, the MCU 7, the SRAM 8, the flash memory 9, and the CAN transceiver 10. At least any one of the first FPGA 61 and the second FPGA 62 may be replaced by an ASIC.

In the foregoing first FPGA 61 and second FPGA 62, a hardware logic is configured based on a bit stream held in the nonvolatile memory 3. Then, each of the first FPGA 61 and the second FPGA 62 receives the analogue data 41 from the sensor 4, the laser detector, and the like that are mounted in the vehicle and the image data 51 from the image-capturing device 5 such as a camera. The first FPGA 61 is provided to perform hardware backup for the second FPGA 62; at a time of shipment, the logic of an edition selected from two or more options including the present edition and the one-generation-prior edition is configured in the first FPGA 61. The second FPGA 62 is provided for a formal system.

MCU 7 has a first nonvolatile memory 71 formed of a flash memory, a second nonvolatile memory 72 formed of a flash memory, an ECM (Error Control Module) 73, and an MMU (Memory Management Unit) 74. Through the gateway 1, a program code (Code0) is installed in the first nonvolatile memory 71 from the remote channel 2. Through the gateway 1, a program code (Code1) is installed in the second nonvolatile memory 72 from the remote channel 2.

The first nonvolatile memory 71 is provided to perform software backup for the second nonvolatile memory 72; at a time of shipment, the first nonvolatile memory 71 has the program code of an edition selected from two or more options including the present edition and the one-generation-prior edition. The second nonvolatile memory 72 is provided for a formal system.

When an abnormality occurs, ECM 73 outputs an error signal to the outside, through the CAN transceiver 10 or the like. MMU 74 performs address management for software and outside resources. SRAM 8 is configured in such a way as to be situated between MCU 7 and the first and second FPGAs 61 and 62 and to temporarily hold data. The flash memory 9 stores necessary communication data, as a log.

The nonvolatile memory 3 for holding the foregoing bit stream and the first and second nonvolatile memories 71 and 72 incorporated in the foregoing MCU are accessible from a remote channel outside the vehicle, through the gateway.

Through control by MCU 7, ECU 100, according to Embodiment 1, that is configured in such a way as described above controls an actuator 11 that operates apparatuses mounted in the vehicle, in a direct manner or through the first FPGA 61 or the second FPGA 62. Through the CAN bus 12, the first FPGA 61 and the second FPGA 62 can perform communication with another ECU. Through the CAN transceiver 10 and the CAN bus 12, MCU 7 can perform communication with another ECU.

Figure 3:
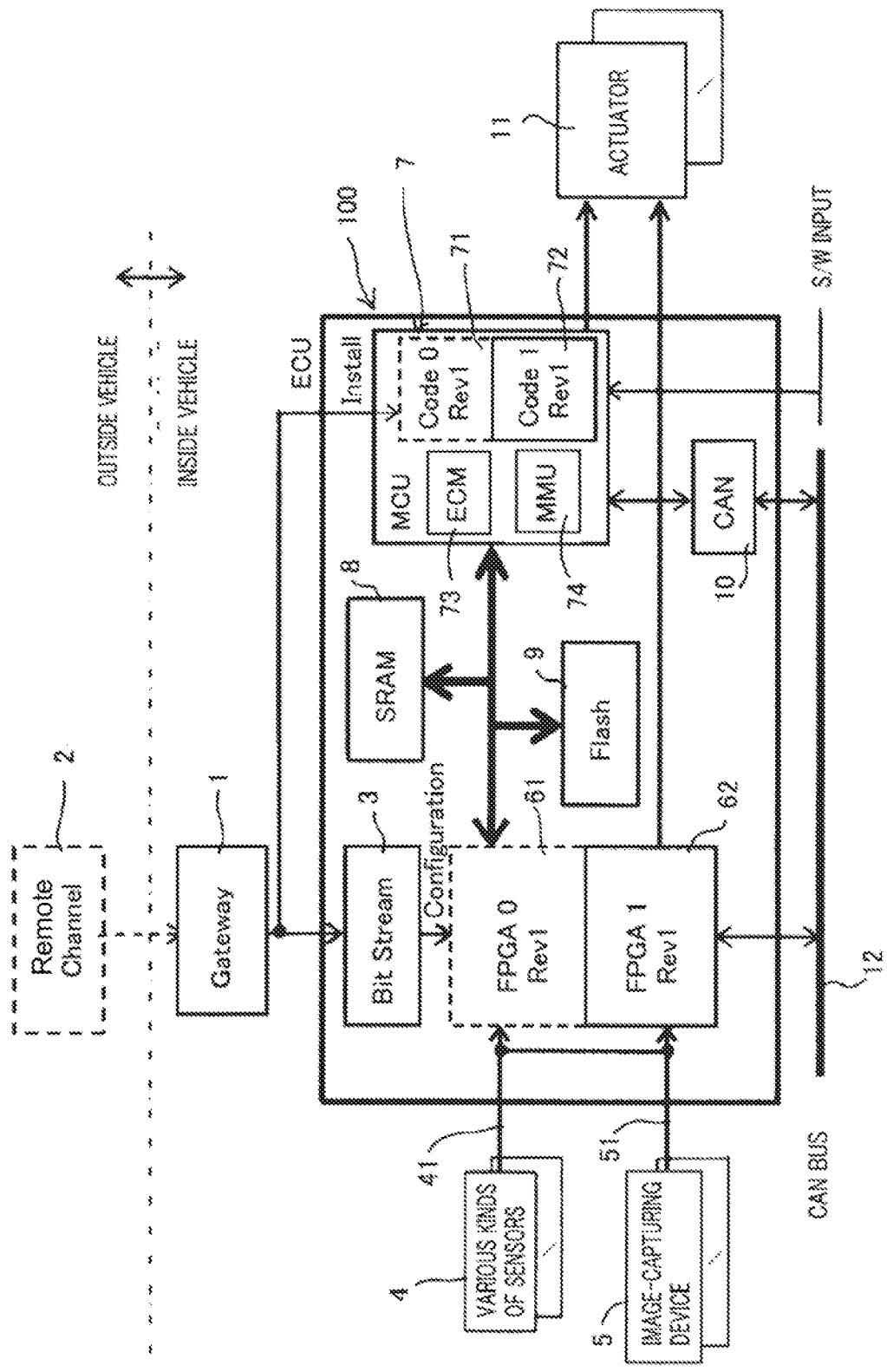
FIG. 3 is a block diagram representing the configuration of the vehicle electronic control apparatus according to Embodiment 1 at a time of initial operation thereof.
Figure 4:
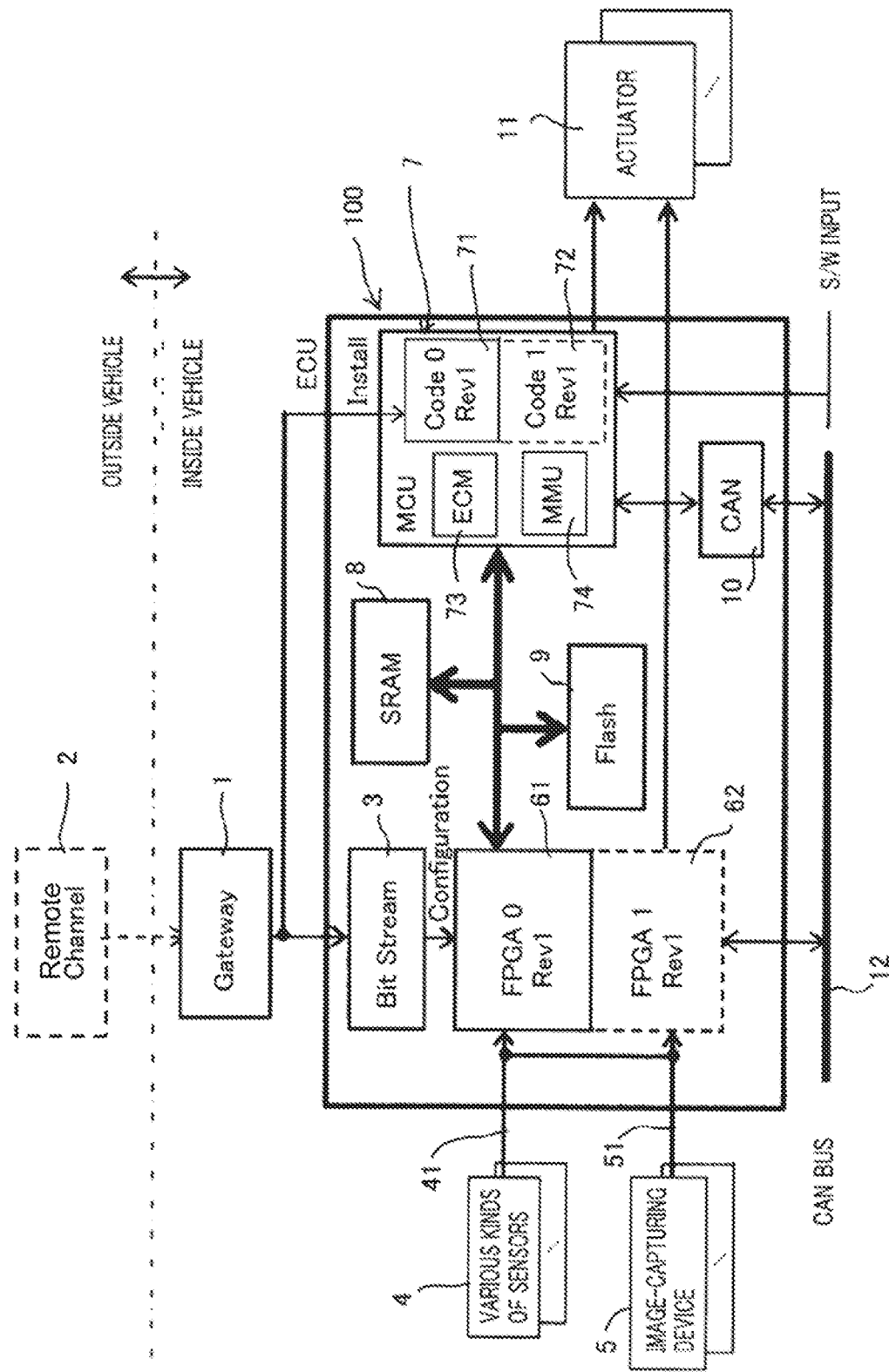
FIG. 4 is a block diagram representing the configuration of the vehicle electronic control apparatus according to Embodiment 1 at a time when a system abnormality occurs.

Next, there will be explained the operation of a backup system at a time when an abnormality occurs in ECU 100 according to Embodiment 1. FIG. 3 is a block diagram representing the configuration of the vehicle electronic control apparatus according to Embodiment 1 at a time of initial operation thereof. As represented in FIG. 3, when ECU 100 is shipped, configuration data (Rev1) for configuring the first FPGA 61 and the second FPGA 62 in the same target circuit is written, as a bit stream, in the nonvolatile memory 3 in a factory. Furthermore, in the factory, target software (Rev1) of the same version is written in each of the first nonvolatile memory 71 and the second nonvolatile memory 72 in MCU 7.

In the factory, after confirming that the second FPGA 62 and the second nonvolatile memory 72 that are provided for the formal system and the first FPGA 61 and the first nonvolatile memory 71 that are provided for the backup system are normal, ECU 100 is shipped.

As described above, MMU 74 that performs address management for the software and the outside resources is mounted in MCU 7 and controls execution software programs in the first nonvolatile memory 71 and the second nonvolatile memory 72 and the first and second FPGAs 61 and 62, which are access subjects. At a time of normal operation, the program code (Code1) installed in the second nonvolatile memory 72 is set as an execution software, and the second FPGA 62 is set as an execution FPGA.

Figure 5:
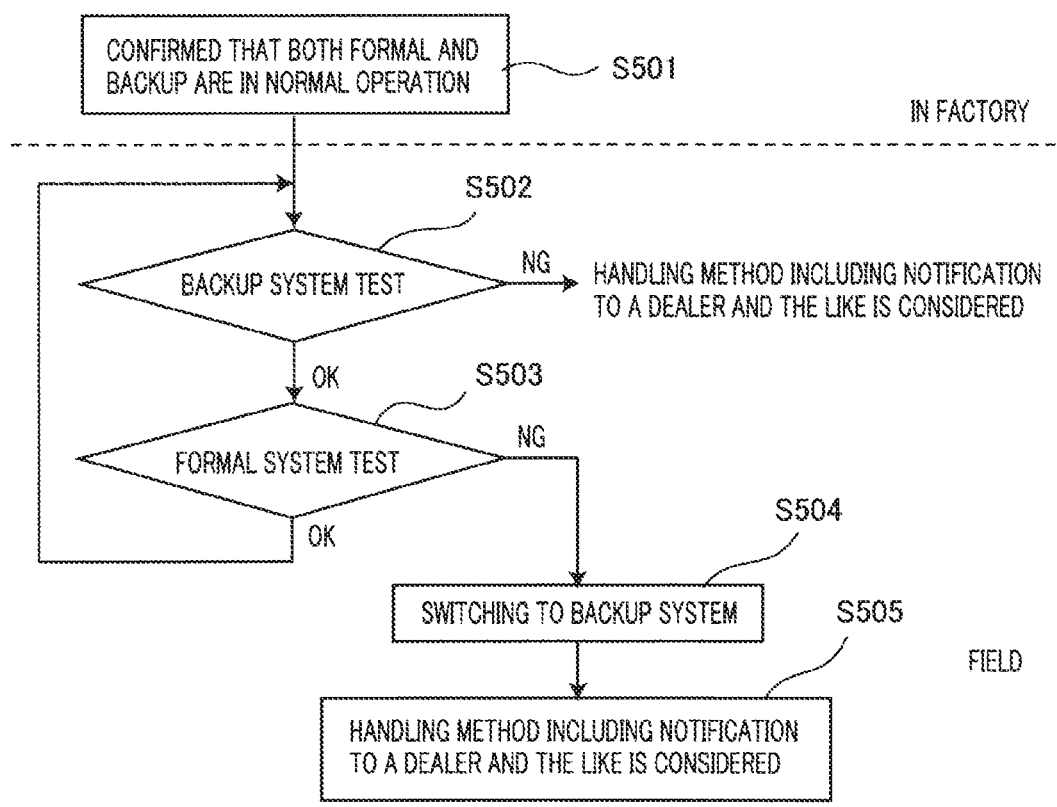
FIG. 5 is a flowchart representing the operation of the vehicle electronic control apparatus according to Embodiment 1 at a time when a system abnormality occurs.

FIG. 5 is a flowchart representing the operation of the vehicle electronic control apparatus according to Embodiment 1 at a time when a system abnormality occurs. As represented in FIG. 5, in the step S501, a self-diagnosis test function is activated at a predetermined timing, for example, at a time when the power is turned on, at a time when the power is turned off, or at an appropriate timing during the operation.

In the step S502, based on the self-diagnosis test function, at first, self-diagnosis is applied to the first nonvolatile memory 71 and the first FPGA 61, as the backup system; in the case where both the first nonvolatile memory 71 and the first FPGA 61 are normal (OK), the step S502 is followed by the step S503; in the case where at least any one of the first nonvolatile memory 71 and the first FPGA 61 is abnormal (NG), there is considered the handling method including notification to a dealer, the notification timing, and the like.

In the case where it is diagnosed in the step S502 that at least any one of the first nonvolatile memory 71 and the first FPGA 61, as the backup system, is abnormal, a log of the implementation time of the self-diagnosis test and the test result is stored in the flash memory 9; then, an alarm is transmitted from ECM 73 provided in MCU 7 to the outside by way of the CAN transceiver 10 and the CAN bus 12.

Next, in the step S503 following the step S502, a self-diagnosis test is applied to the second nonvolatile memory 72 and the second FPGA 62, as the formal system; in the case where both the second nonvolatile memory 72 and the second FPGA 62 are normal, the step S502 is resumed. In contrast, in the case where at least any one of the second nonvolatile memory 72 and the second FPGA 62 is abnormal (NG), the step S503 is followed by the step S504.

In the case where it is diagnosed in the foregoing step S503 that the second nonvolatile memory 72 is abnormal, the second nonvolatile memory 72 is switched to the first nonvolatile memory 71, as the backup system; in the case where it is diagnosed in the step S503 that the second FPGA 62 is abnormal, the second FPGA 62 is switched to the first FPGA 61, as the backup system. In the case where it is diagnosed in the step S503 that both the second nonvolatile memory 72 and the second FPGA 62 are abnormal, the second nonvolatile memory 72 is switched to the first nonvolatile memory 71 and the second FPGA 62 is switched to the first FPGA 61.

Describing the foregoing switching in a more specific manner, in the case where it is diagnosed in the step S503 that at least any one of the second nonvolatile memory 72 and the second FPGA 62, as the formal system, is abnormal, a log of the implementation time of the self-diagnosis test and the test result is stored in the flash memory 9; then, an alarm is transmitted from ECM 73 provided in MCU 7 to the outside by way of the CAN transceiver 10 and the CAN bus 12, and MMU 74 receives an error detection signal from ECM 73 and then performs rearrangement of an execution address, so that the operation system is switched from the second nonvolatile memory 72 or the second FPGA 62, as the formal system, to the first nonvolatile memory 71 or the first FPGA 61, as the backup system.

Next, in the step S505, there is considered the handling method including notification to a dealer, the notification timing, and the like.

Next, system updating operation in ECU 100 according to Embodiment 1 will be explained. In the case where the function of ECU 100 is updated or in the case where due to addition of a function, it is required to modify the system of the nonvolatile memory or the FPGA, the nonvolatile memory 3 receives from the remote channel 2 a bit stream related to updating of the system, by way of the gateway 1, so that the first FPGA 61 and the second FPGA 62 are reconfigured; concurrently, new software related to updating of the system is received from the remote channel 2 by way of the gateway 1 and is stored in the first nonvolatile memory 71 and the second nonvolatile memory 72.

Figure 6:
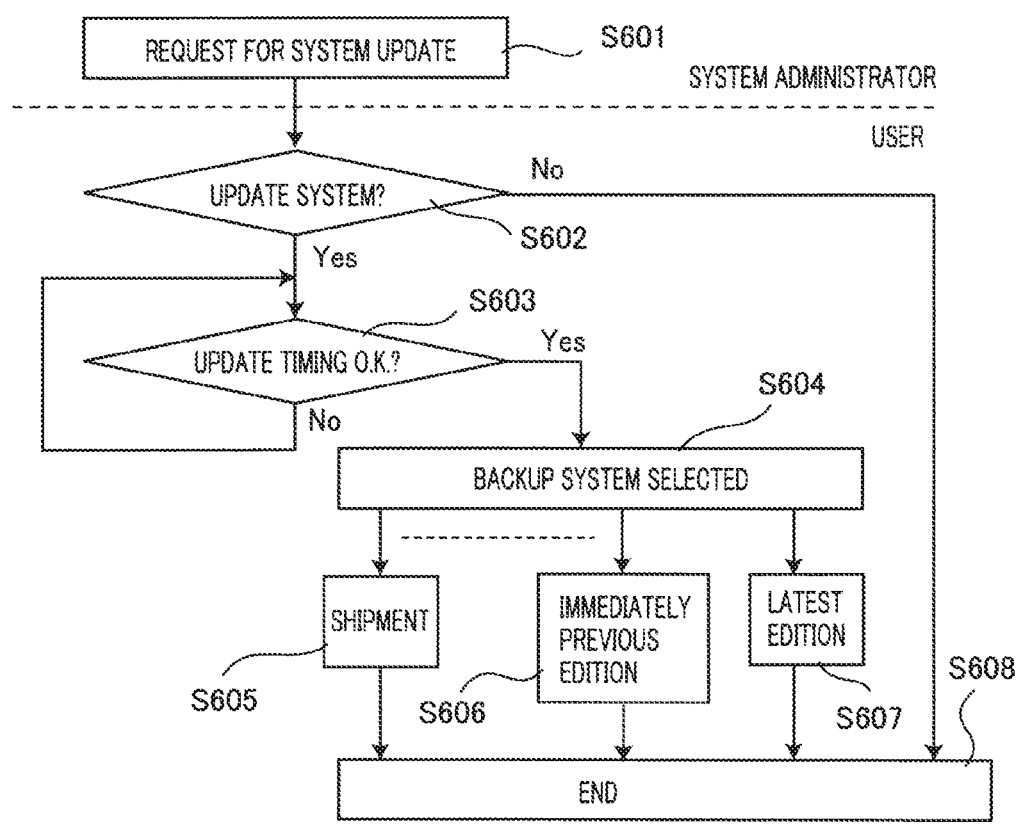
FIG. 6 is a flowchart representing the operation of the vehicle electronic control apparatus according to Embodiment 1 at a time when the system thereof is updated.

FIG. 6 is a flowchart representing the operation of the vehicle electronic control apparatus according to Embodiment 1 at a time when the system is updated. In FIG. 6, in the step S601, the system administrator issues a system update request to the user. In the step S602, the user examines whether or not the system should be updated; in the case where it is determined that the system is not updated (No), the step S602 is followed by the step S608 and then the processing is ended; in the case where it is determined that the system is updated (Yes), the step S602 is followed by the step S603.

In the step S603, it is determined whether or not the present system update timing is appropriate; in the case where the present system update timing poses no problem (Yes), the step S603 is followed by the step S604. In the step S604, with regard to the first FPGA 61 and the second FPGA 62, the bit stream is updated from the remote channel 2 through the gateway 1; then, the new bit stream is stored in the nonvolatile memory 3. Moreover, through the gateway 1, the program code in each of the first nonvolatile memory 71 and the second nonvolatile memory 72 in MCU 7 is updated to a new program code from the remote channel 2.

In this situation, with regard to the second FPGA 62 and the second nonvolatile memory 72, as the formal system, the version is updated to a new version received from the remote channel 2; however, with regard to the first FPGA 61 and the first nonvolatile memory 71, as the backup system, a desired version can be selected from versions such as the version at a time of shipment (the step S605), no update, the immediately previous edition (the step S606), the latest edition (the step S607), the version the same as that of the formal system, and the like.

The configuration of the first FPGA 61, selected from the foregoing options, becomes the operation system at a time when an abnormality occurs in the second FPGA 62 as the formal system. The program code of the first nonvolatile memory 71, selected from the foregoing options, becomes the operation system at a time when an abnormality occurs in the second nonvolatile memory 72 as the formal system.

In ECU 100 according to foregoing Embodiment 1, in the case where after a vehicle as a finished product has been shipped, it is required to modify the software or the logic of the ECU, the software or the logic thereof can be modified without replacing the ECU; moreover, even when an abnormality occurs in the ECU, the backup system makes it possible to perform normal operation without replacing the ECU.

Although the present disclosure is described above in terms of an exemplary embodiment, it should be understood that the various features, aspects and functions described in the embodiment are not limited in their applicability to the particular embodiment with which they are described, but instead can be applied, alone or in various combinations to the embodiment. It is therefore understood that numerous modifications which have not been exemplified can be devised without departing from the scope of the technology disclosed in the present disclosure. For example, at least one of the constituent components may be modified, added, or eliminated.

What is claimed is:

1. A vehicle electronic control apparatus receiving at least any one of information from a sensor that detects an operation state of an internal combustion engine mounted in a vehicle and a driving state of the vehicle, information from a controller area network (CAN), and information from a remote channel and outputting a control command calculated based on the received information to an apparatus mounted in the vehicle, the vehicle electronic control apparatus comprising:

two or more field programmable gate arrays (FPGAs) that each receive information from the sensor, the two or more FPGAs including a first FPGA and a second FPGA, wherein the first FPGA is provided as a backup hardware for the second FPGA;

a nonvolatile memory that holds a bit stream for determining a configuration for the FPGAs;

a micro control unit (MCU) comprising:
two or more nonvolatile memories comprising a first nonvolatile memory and a second nonvolatile memory, in each of which a program code for calculating the control command is installed, wherein the program code in the first nonvolatile memory is provided as a backup software for the program code in the second nonvolatile memory;

an error control module that outputs an error signal to the outside at a time when an abnormality occurs in at least one of the FPGAs and the nonvolatile memories; and a memory management unit (MMU) that
performs address management for the program code stored in the first nonvolatile memory and the program code stored in the second nonvolatile memory, switches an operating system of the vehicle electronic control apparatus from the second FPGA and the second nonvolatile memory to the first FPGA and the first nonvolatile memory based on a control signal indicating that the abnormality occurs in the second FPGA and the second nonvolatile memory, switches the operation system from the second FPGA and the second nonvolatile memory to the second FPGA and the first nonvolatile memory based on the control signal indicating that the abnormality occurs in the second nonvolatile memory, not in the second FPGA, and switches the operation system from the second FPGA and the second nonvolatile memory to the first FPGA and the second nonvolatile memory based on the control signal indicating that the abnormality occurs in the second FPGA, but not in the second nonvolatile memory, wherein the nonvolatile memory that holds the bit stream and the nonvolatile memories incorporated in the MCU are accessible from the outside, wherein hardware configured with the second FPGA and the program code installed in the second nonvolatile memory form a formal system to be utilized at a time of normal operation, wherein hardware configured with the first FPGA and the program code installed in the first nonvolatile memory form a backup system to be utilized at a time of the abnormality, wherein the formal system is configured to be able to perform a self-diagnosis test, and wherein when the formal system is diagnosed as being abnormal based on the self-diagnosis test, the formal system is switched to the backup system so that an operation of the vehicle electronic control apparatus is continued, wherein the backup system is configured to perform a self-diagnosis test, and wherein after the backup system is diagnosed as being normal based on the self-diagnosis test, the self-diagnosis test is performed on the formal system, wherein the backup system holds two or more system versions including a first system version at a time of shipment from a factory and a second system version that is equal to a system version of the formal system, and wherein when the system version in the formal system is updated, the backup system is provided with a first option of being updated to the first system version at the time of shipment from the factory, a second option of being updated to the second system version that is equal to the system version of the formal system, and a third option of not being updated, and selects any one of the first option, the second option, and the third option.

2. The vehicle electronic control apparatus according to claim 1, wherein when the MMU receives the error signal from the error control module, the MMU performs rearrangement of an execution address so that the operating system of the vehicle electronic control apparatus is switched from the second FPGA and the second nonvolatile memory to the first FPGA and the first nonvolatile memory.

3. The vehicle electronic control apparatus according to claim 1, wherein the vehicle electronic control apparatus further comprises:

a controller area network (CAN) transceiver that selectively communicates with the first nonvolatile memory or the second nonvolatile memory included in the MCU, according to the current operating system of the vehicle electronic control apparatus, wherein the two or more FPGAs, the nonvolatile memory, and the MCU are included in an electronic control unit (ECU) of the vehicle, and wherein the MCU enables the ECU to control an actuator of the vehicle and to communicate another ECU via the CAN transceiver.

4. The vehicle electronic control apparatus according to claim 1, wherein the first FPGA and the second FPGA are in a same circuit, and wherein each of the first FPGA and the second FPGA is connected to the sensor and a camera, and either the first FPGA and the second FPGA receives and processes information of the operation state of the internal combustion engine from the sensor and to receive image data from the camera, according to the current operating system.

\* \* \* \* \*